US006939638B2

(12) United States Patent
Saito et al.

(10) Patent No.: US 6,939,638 B2
(45) Date of Patent: Sep. 6, 2005

(54) FUEL CELL SEPARATOR, PROCESS FOR PRODUCTION THEREOF, AND POLYMER ELECTROLYTE FUEL CELL

(75) Inventors: Kazuo Saito, Chiba (JP); Atsushi Hagiwara, Chiba (JP); Atsushi Miyazawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 240 days.

(21) Appl. No.: 09/899,107

(22) Filed: Jul. 6, 2001

(65) Prior Publication Data

US 2003/0031912 A1 Feb. 13, 2003

(30) Foreign Application Priority Data

Jul. 6, 2000 (JP) ....................................... 2000-204728

(51) Int. Cl.[7] ................................................ H01M 2/00

(52) U.S. Cl. ........................... 429/34; 429/38; 252/511; 264/241

(58) Field of Search ............................. 429/34, 32, 38; 264/241, 122, 319; 252/500, 511

(56) References Cited

U.S. PATENT DOCUMENTS 3,634,569 A * 1/1972 Emanuelson et al. ....... 264/105
4,980,250 A * 12/1990 Takahashi et al. .......... 429/306
2002/0028368 A1 * 3/2002 Saito et al. ................... 429/34
2002/0068210 A1 * 6/2002 Saito et al. ................... 429/34

FOREIGN PATENT DOCUMENTS

JP 08-40724 * 2/1996 ........... C01G/49/00
JP A11297337 10/1999
JP A2000100453 4/2000

* cited by examiner

*Primary Examiner*—Raymond Alejandro
(74) *Attorney, Agent, or Firm*—Birch, Stewart, Kolasch & Birch, LLP

(57) ABSTRACT

Disclosed herein are a fuel cell separator having gas supply grooves on one side or both sides thereof which is molded from a composition composed mainly of an electrically conductive carbon powder and a binding agent, wherein the electrically conductive carbon powder is present such that its particles longer than 70 μm at maximum in the major axis direction and longer than 30 μm at maximum in the minor axis direction along the vertical cross section of the fuel cell separator occupy more than 50% of the sectional area in the vertical direction, a process for production of the separator, and a polymer electrolyte fuel cell.

18 Claims, 3 Drawing Sheets

FUEL CELL SEPARATOR, PROCESS FOR PRODUCTION THEREOF, AND POLYMER ELECTROLYTE FUEL CELL

BACKGROUND OF THE INVENTION

The present invention relates to a fuel cell separator, a process for production thereof, and a polymer electrolyte fuel cell. More particularly, the present invention relates to a fuel cell separator having high elasticity, high electrical conductivity, and good moldability and a process for production thereof. The present invention relates also to a fuel cell having good gas sealing performance and good impact resistance in which all or part of the separators are those which are mentioned above. The fuel cell is suitable for use as a mobile power source for cars, hybrid cars, and small ships.

A polymer electrolyte fuel cell is composed of tens to hundreds of fuel cells (as unit cells) connected together. Each fuel cell consists of two fuel cell separators 1 and one polymer electrolyte membrane 2 and two gas diffusion electrodes 3 which are held between the separators, each separator having a plurality of ribs 1*a* on both sides thereof, as shown in FIG. 1.

The above-mentioned fuel cell separator 1 is a thin platy body having a plurality of ribs la on both sides thereof and a plurality of gas feed grooves 4 on one side or both sides thereof, as shown in FIGS. 2A and 2B. The ribs 1*a* of the separator and the electrode 3 form passages 5 for fuel gas such as hydrogen and oxygen to be supplied and discharged. Therefore, the fuel cell separators are required to have high elasticity and good dimensional accuracy. Moreover, the fuel cell separators and unit fuel cells are required to have good gas seal performance to prevent the leakage of fuel gas, good resistance to cracking by tightening at the time of assembling, and good impact resistance for the fuel cell to be used as a mobile power source for automobiles.

To meet these requirements, there has been proposed a separator for polymer electrolyte fuel cell in Japanese Patent Laid-open No. Hei 11-297337. This separator is obtained by curing from a homogenous mixture composed of 100 parts by weight of carbonaceous powder and 10 to 100 parts by weight of thermosetting resin. According to this disclosure, the carbonaceous powder is a graphite powder having a maximum particle diameter of 125 μm or below. There has also been disclosed a fuel cell separator in Japanese Patent Publication No. 2000-100453. This separator contains expansible graphite particles having a number-average particle diameter of 25 μm or above, preferably 25 to 500 μm.

Conventional fuel cell separators are made of a highly filled material which encounters difficulties in injection molding. The disadvantage of the above-mentioned separators containing graphite powder is that the fine graphite powder lowers the fluidity of the molding material, adversely affecting injection moldability and mechanical properties. Flake graphite has such a low bulk density that the material containing it slips on the screw of the injection molding machine, making itself incapable of molding. Graphite with a comparatively high bulk density is easily broken into fine powder at the time of mixing or injection molding.

Since a unit cell merely produces a low voltage, it is necessary to connect tens to hundreds of unit cells if a practical output (up to hundreds of kW) is to be obtained. Therefore, there is an urgent demand for a technology that permits efficient mass production of fuel cell separators having a uniform shape free of strain and thickness variation.

Conventional fuel cell separators are made of a composition composed of a thermosetting resin such as phenolic resin, and graphite. This composition is incorporated with a large amount of graphite so that the resulting separator has electrically conductivity as required. Therefore, it lacks fluidity and presents difficulties in injection molding. Actual production of separators is by compression molding, which involves heating at 150 to 160° C. and pressing at 14.7 to 29.4 MPa for 5 to 10 minutes. Compression molding is slow and inefficient for mass production.

SUMMARY OF THE INVENTION

The present invention was completed in view of the foregoing. It is an object of the present invention to provide a high-quality fuel cell separator having high elasticity, high electrical conductivity, and good gas impermeability. It is another object of the present invention to provide a process for producing the fuel cell separator, the process being suitable for efficient, mass production. It is another object of the present invention to provide a polymer electrolyte fuel cell having good gas sealing performance and good impact resistance in which the separators are immune to cracking by tightening at the time of assembling.

In order to achieve the above-mentioned object, the present inventors carried out extensive studies. As the result, it was found that a molding composition easily affords a fuel cell separator having good mechanical strength and high electrical conductivity if it contains a large amount of electrically conductive carbon powder of high bulk density.

In other words, it was found that the above-mentioned object is achieved by a fuel cell separator having gas supply grooves on one side or both sides thereof which is molded from a composition composed mainly of an electrically conductive carbon powder and a binding agent. According to the present invention, the composition contains 100 parts by mass of the electrically conductive carbon powder and 10 to 50 parts by mass of the binding agent, and the electrically conductive powder is spherical or massive graphite of high bulk density having a mean particle diameter of 100 to 500 μm. The electrically conductive carbon powder is present such that its particles longer than 50 μm at maximum in the major axis direction and longer than 30 μm at maximum in the minor axis direction along the vertical cross section of the fuel cell separator occupy more than 50% of the sectional area in the vertical direction. The fuel cell separator meeting the above-mentioned requirements has high elasticity, high electrical conductivity, and good gas impermeability. A stack of fuel cells in which all or part of the separators in the fuel cells are those which are mentioned above is immune to cracking by tightening at the time of assembling; therefore, it offers good gas seal performance and good impact resistance. It is suitable for use as a portable power source for cars, hybrid cars, and small ships. The above-mentioned finding is the basis of the present invention.

According to the present invention, the fuel cell separator is molded from a mixture (molding composition) containing 100 parts by mass of electrically conductive powder and 10 to 50 parts by mass of binding agent. This molding composition is suitable for injection molding for economical, efficient, mass production of fuel cell separators which are a thin platy body of peculiar shape having gas supply grooves on one side or both sides thereof.

The present invention is directed to a fuel cell separator, a process for production thereof, and a polymer electrolyte fuel cell, as explained in the following.

The first aspect of the present invention covers a fuel cell separator having gas supply grooves on one side or both sides thereof which is molded from a composition composed mainly of an electrically conductive carbon powder and a binding agent, wherein the electrically conductive carbon powder is present such that its particles longer than 50 μm at maximum in the major axis direction and longer than 30 μm at maximum in the minor axis direction along the vertical cross section of the fuel cell separator occupy more than 50% of the sectional area in the vertical direction.

The second aspect of the present invention covers a fuel cell separator having gas supply grooves on one side or both sides thereof which is molded from a composition composed mainly of an electrically conductive carbon powder and a binding agent, wherein the binding agent is contained in an amount of 10 to 50 parts by mass for 100 parts by mass of the electrically conductive carbon powder and the electrically conductive carbon powder is spherical or massive graphite having a mean particle diameter of 100 to 500 μm.

The third aspect of the present invention covers the fuel cell separator as defined in the second aspect, wherein the spherical or massive graphite has a bulk density higher than 0.6 g/ml.

The fourth aspect of the present invention covers the fuel cell separator having gas supply grooves on one side or both sides thereof which is molded from a composition composed mainly of an electrically conductive carbon powder and a binding agent as defined in the second or third aspect, wherein the electrically conductive carbon powder is present such that its particles longer than 50 μm at maximum in the major axis direction and longer than 30 μm at maximum in the minor axis direction along the vertical cross section of the fuel cell separator occupy more than 50% of the sectional area in the vertical direction.

The fifth aspect of the present invention covers the fuel cell separator as defined in any one of the first to fourth aspects, which has a resistivity not higher than 20 mΩ·cm measured according to JIS H0602.

The sixth aspect of the present invention covers a process for producing a fuel cell separator having gas supply grooves on one side or both sides thereof from a composition composed mainly of an electrically conductive carbon powder and a binding agent, wherein the process comprising injection molding a mixture containing 10 to 50 parts by mass of a binding agent for 100 pars by mass of the electrically conductive carbon.

The seventh aspect of the present invention covers the fuel cell separator as defined in the sixth aspect, wherein the electrically conductive carbon powder is spherical or bulky graphite having a mean particle diameter of 100 to 500 μm, and the spherical or bulky graphite has a bulk density higher than 0.6 g/ml.

The eighth aspect of the present invention covers a polymer electrolyte fuel cell consisting of a plurality of unit cells connected together, each unit cell consisting of a pair of electrodes holding a polymer electrolyte membrane between them and a pair of separators holding the electrodes between them, the separator having passages molded thereon through which gas is supplied and discharged, characterized in that all or part of the separators in the fuel cells are those which are defined in any one of the first to fifth aspects.

DESCRIPTION OF THE PREFERRED EMBODIMENTS

The invention will be described in more detail below. According to the present invention, the fuel cell separator which has gas supply grooves on one side or both sides thereof is formed from a composition composed mainly of an electrically conductive carbon powder and a binding agent. The electrically conductive carbon powder is present such that its particles longer than 50 μm at maximum in the major axis direction and longer than 30 μm at maximum in the minor axis direction along the vertical cross section of the fuel cell separator occupy more than 50% of the sectional area in the vertical direction. Because of these characteristics properties, the fuel cell separator has good mechanical properties, electrical conductivity, and gas impermeability.

Figure 2A:
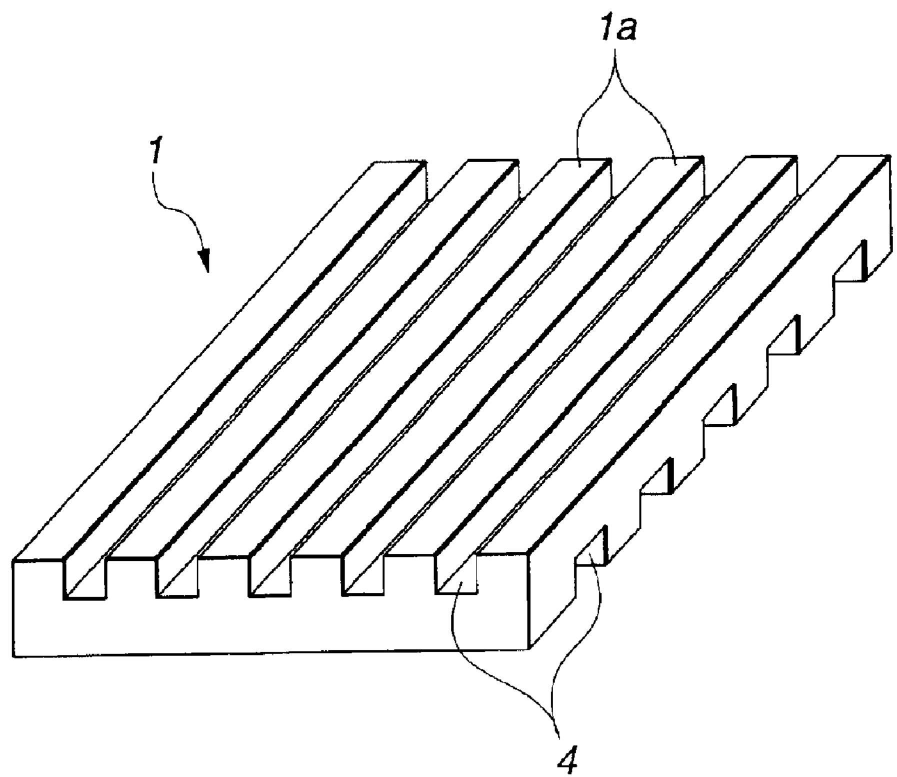
FIG. 2 is a perspective view showing the fuel cell separator pertaining to one embodiment of the present invention.
Figure 2B:
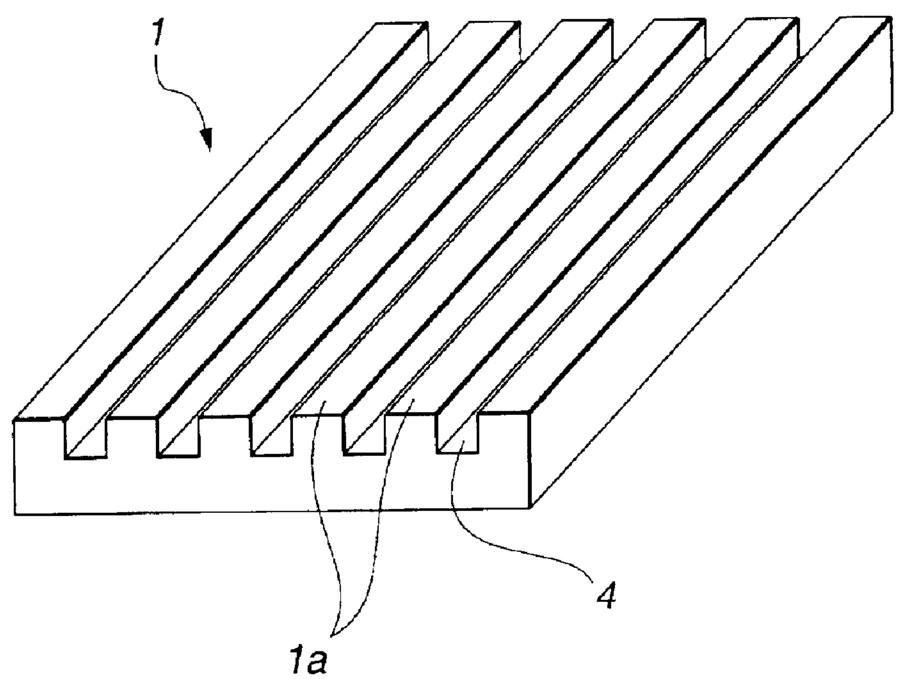

The cross section specified above is noticed when the fuel cell is cut vertical in the thickness direction and the cut surface is observed under a microscope provided with a digital CCD camera ("Axioscope 2" made by Carl Zeiss Co., Ltd.). The fuel cell separator is a flat platy body, measuring 120 mm long, 120 mm wide, and 2.3 mm thick, having gas supply grooves on one side or both sides thereof, as shown in FIGS. 2A and 2B. An example of the microphotograph (×200) thus obtained is shown in reference photographs 1 and 2. White irregular shapes represent graphite particles. Incidentally, the magnification should preferably be 50 to 500 times, more preferably 50 to 200 times.

Figure 3:
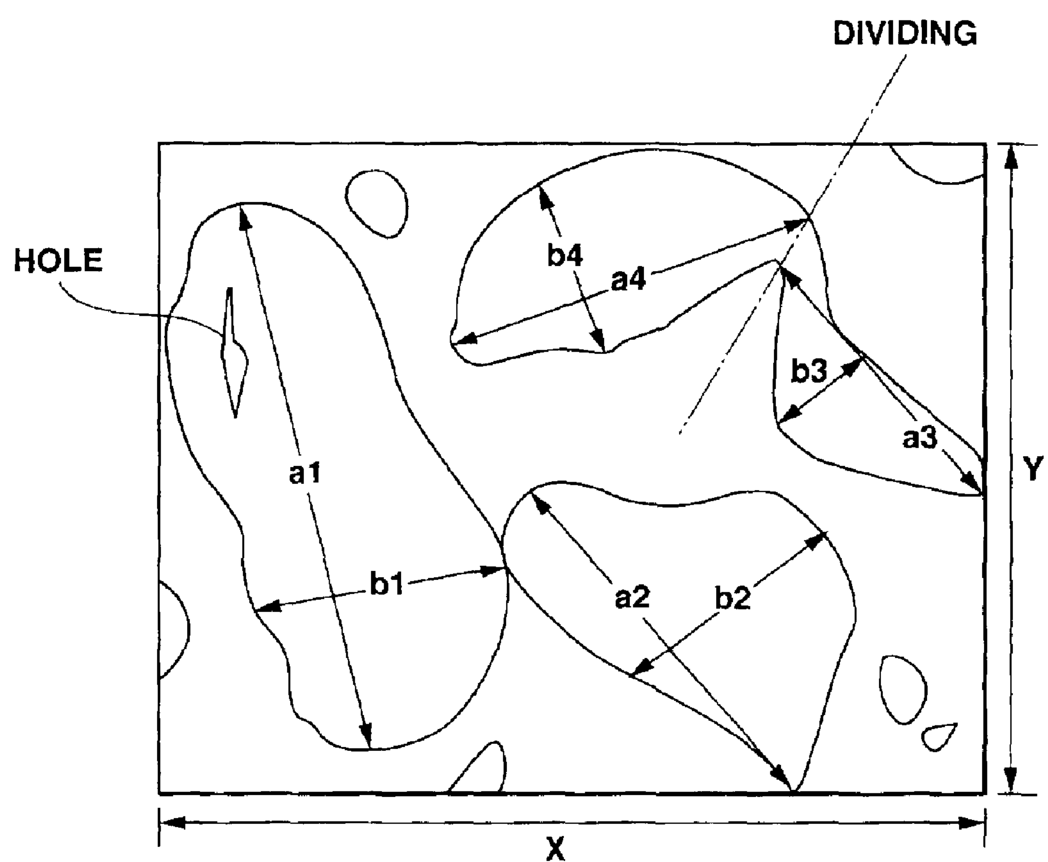
FIG. 3 is a schematic diagram showing the vertical cross section of the separator.

The thus obtained digital microphotograph is examined as follows for irregular graphite particles to estimate their size and their area occupying in the photograph. First, the maximum lengths in the major axis direction and the minor axis direction are measured, and graphite particles are selected which have a maximum length of 50 μm and above in the major axis direction and a maximum length of 30 μm and above in the minor axis direction, as shown in FIG. 3. The approximate area of a graphite particle is calculated by multiplying the length in the major axis direction by the length in the minor axis direction. It is not always necessary that the maximum length in the major axis direction is the length that passes through the center of a graphite particle. Instead, the longest line across a graphite particle is regarded as the maximum length in the major axis direction. The longest line perpendicular to the maximum line in the major axis direction is regarded as the maximum length in the minor axis direction. A hole may be neglected unless it is large enough to split a graphite particle. In the case of a graphite particle having a very complex shape, it is possible to obtain its area by dividing it into several parts.

To be more specific, the schematic diagram in FIG. 3 (illustrating the vertical cross section) permits one to calculate the approximate total area (S1) of graphite particles by summing up (a1×b1)+(a2×b2)+(a3×b3)+(a4×b4) . . . . The ratio of the area occupied by graphite particles is calculated from (S1/S2)×100, where S1 is the total area occupied by graphite particles and S2 is the area of the vertical cross section (x×y in FIG. 3).

According to the present invention, the maximum length in the major axis direction in the vertical cross section should be 50 μm or above, preferably 70 μm or above, and the maximum length in the minor axis direction in the vertical cross section should be 30 μm or above, preferably 50 μm or above, and the ratio of the area occupied by graphite particles should be 50% or above, preferably 50 to 80%, more preferably 55 to 75%, and most desirably 60 to 75%. If the ratio of the area occupied by graphite particles is smaller than specified above, the resulting fuel cell separator does not have characteristic properties required. Conversely, if it is larger than specified above, the resulting fuel cell separator has remarkably low mechanical strength.

The fuel cell separator according to the present invention is formed from a composition composed mainly of (A) an electrically conductive carbon powder and (B) a binding agent.

The electrically conductive carbon powder as component (A) is either natural one or artificial one, such as carbon black, Ketjen black, acetylene black, carbon whisker, and graphite. They may be used alone or in combination with one another. Of these examples, graphite is particularly preferable.

The graphite used in the present invention is spherical graphite or massive graphite. Flake graphite is not desirable because it gives such defects as flow marks and weld lines to the molded product, or it causes cracking. In addition, flake graphite has a low bulk density and hence causes the molding composition to slip on the screw of the injection molding machine. The spherical graphite or massive graphite should have a bulk density of 0.6 g/ml or above, preferably 0.7 g/ml or above, more preferably 0.7 to 1.2 g/ml, and most desirably 0.7 to 1.0 g/ml, which is measured according to JIS K6891-1995. With an excessively low bulk density, the graphite causes the above-mentioned troubles and adversely affects the moldability of the molding composition.

The electrically conductive carbon powder should be one which has a mean particle diameter of 100 to 500 μm, preferably 150 to 450 μm, more preferably 150 to 400 μm. One which is coarser than specified above will make the molding composition poor in fluidity and presents difficulties in injection molding. Conversely, one which is finer than specified above will have an adverse effect on the mechanical properties or gas impermeability of the separator.

The binding agent as component (B) above is not specifically restricted. It may be selected from any of the following thermosetting resins and thermoplastic resins. Examples of thermosetting resins include phenolic resin such as resol type or novolak type, furan resin such as furfuryl alcohol resin and furfuryl alcohol phenolic resin, polyimide resin, polycarbodiimide resin, polyacrylonitrile resin, pyrene-phenanthrene resin, polyvinyl chloride resin, epoxy resin, urea resin, diallylphthalate resin, unsaturated polyester resin, and melamine resin. They may be used alone or in combination with one another.

Examples of thermoplastic resins include styrene resins such as acrylonitrile-butadiene-styrene resin (ABS), acrylonitrile-styrene copolymer (AS), high-impact polystyrene (HIPS), polystyrene (PS), methyl methacrylate-butadiene-styrene copolymer (MBS), methyl methacrylate-styrene copolymer (MS), acrylonitrile-ethylene-propylene rubber-styrene copolymer (AES), and acrylonitrile-styrene-acrylate (AAS), polyolefin resins such as polyethylene (PE), polypropylene (PP), polybutene-1, ethylene-vinyl acetate copolymer (EVA), and ethylene-vinyl alcohol copolymer (EVOH), polyamide resin, thermoplastic polyester resin, polycarbonate resin (PC), wholly aromatic polyester resin, polyphonylene sulfide (PPS), polyvinyl chloride resin (PVC), polysulfone resin, polyether-ether-ketone resin, (modified) polyphenylene ether resin, polyoxymethylene (POM), polymethyl methacrylate (PMMA), fluoroplastic resin, polyketone resin (PK), norbornane, polyamideimide (PAI), and polyphthalamide (PPA). They may be used alone or in combination with one another.

The binding agent as component (B) should be used in an amount of 10 to 50 parts by mass, preferably 10 to 40 parts by mass, more preferably 15 to 30 parts by mass, for 100 parts by mass of the electrically conductive carbon powder as component (A). If the amount of the binding agent as component (B) is less than specified above, the resulting molding composition is poor in fluidity and presents difficulties in injection molding. Conversely, if it is more than specified above, the molding compound cannot be incorporated sufficiently with the electrically conductive carbon powder and hence the resulting separator is poor in electrical conductivity.

The molding composition of the fuel cell separator of the present invention may be incorporated with, in addition to the above-mentioned components (A) and (B), optional additives such as fibrous base material, mold release, metal powder, and hydrolysis resisting agent, for improvement in strength, mold releasability, hydrolysis resistance, and electrical conductivity.

The above-mentioned fibrous base material includes inorganic fiber and organic fiber. Inorganic fiber includes metal fiber such as iron, copper, brass, bronze, aluminum or the like, ceramics fiber, potassium titanate fiber, glass fiber, carbon fiber, rock wool, wollastonite, sepiolite, attapulgite, and artificial mineral fiber. Organic fiber includes aramid fiber, polyimide fiber, polyamide fiber, phenolic fiber, cellulose, and acrylic fiber. They may be used alone or in combination with one another. The fibrous base material should be used in an amount of 0 to 10 parts by mass for 100 parts by mass of the electrically conductive carbon powder as component (A).

The above-mentioned mold release is not specifically restricted; it includes silicone-based ones, fluorine-based one, metallic soap-based ones, amide-based ones, and wax-based ones. Internal mold release agents such as carnauba wax, stearic acid, and montanic acid are preferable. The mold release should be used in an amount of 0 to 3 parts by mass for 100 parts by mass of the electrically conductive carbon powder as component (A).

The above-mentioned metal powder includes those of stainless steel, gold, silver, copper, platinum, titanium, aluminum, and nickel. The metal powder should be one which has a mean particle diameter of 5 to 30 μm.

According to the present invention, the fuel cell separator having gas supply grooves on one side or both sides thereof is produced by injection molding from a mixture of 100 parts by mass the electrically conductive carbon powder as component (A) and 10 to 50 parts by mass of the binding agent as component (B). It is desirable that the electrically conductive carbon powder be spherical or massive graphite having a mean particle diameter of 100 to 500 μm and a bulk density of 0.6 g/ml or above.

The above-mentioned components for the molding composition should be mixed by means of single-screw extruder or twin-screw extruder or general-purpose mixer. The resulting mixture may be pelletized or merely dried. Mixing by means of a mixer is desirable from the standpoint of not breaking the particles of the electrically conductive carbon powder.

The thus obtained mixture undergoes injection molding. The conditions of injection molding vary depending on the injection molding machine and the kind and amount of the binding agent. The following conditions are usually desirable.

| | |
|---|---|
| Cylinder temperature: | 50 to 100° C. (at front) |
| Injection pressure: | 8 to 20 MPa |
| Injection time: | 5 to 15 seconds |
| Mold temperature: | 140 to 200° C. |
| Curing time: | 15 to 200 seconds |

Injection molding is not an only method of producing the fuel cell separator of the present invention. Other known molding methods that can be used individually or in combination include compression molding, injection-compression molding, transfer molding, extrusion molding, hydrostatic molding, belt pressing, and roll molding.

Owing to the electrically conductive carbon powder having a high bulk density, the production by injection molding according to the present invention permits stable injection molding with complete filling into the mold. Injection molding permits the production of the fuel cell separator of unique shape having gas supply grooves on one side or both sides thereof, as shown in FIGS. 2A and 2B. Therefore, it is suitable for efficient mass production.

The fuel cell separator obtained as mentioned above should have a resistivity not higher than 20 mΩ·cm, preferably not higher than 15 mΩ·cm, more preferably 2 to 15 mΩ·cm, which is measured according to JIS H0602 providing the four point probe method for measuring the resistivity of silicon single crystal and silicon wafer.

The fuel cell separator of the present invention should have mechanical strength such that a test piece (100×10×4 mm) prepared from the molding composition according to JIS K6911 proving "General test methods for thermosetting plastics" has a flexural strength of 20 to 80 MPa, preferably 25 to 60 MPa, a flexural modulus of 1 to 15 GPa, preferably 2 to 10 GPa, and a strain of 2 to 15 mm, preferably 3 to 12 mm.

The fuel cell separator of the present invention should have gas permeability such that a specimen (2 mm thick, 100 mm in diameter) prepared from the molding composition according to JIS K7126 providing "Method of evaluating the gas permeability of plastics film" (method B, equal pressure method) has a nitrogen gas permeability at 23° C. not higher than 20 $ml/m^2 \cdot 24$ hr·atm, preferably 2 to 20 $ml/m^2 \cdot 24$ hr·atm, and more preferably 5 to 15 $ml/m^2 \cdot 24$ hr·atm.

The present invention covers a polymer electrolyte fuel cell consisting of a plurality of unit cells connected together, each unit cell consisting of a pair of electrodes holding a polymer electrolyte membrane between them and a pair of separators holding the electrode between them, the separator having passages molded thereon through which gas is supplied and discharged. This polymer electrolyte fuel cell is characterized in that all or part of the separators in the unit cells are those of the present invention.

Figure 1:
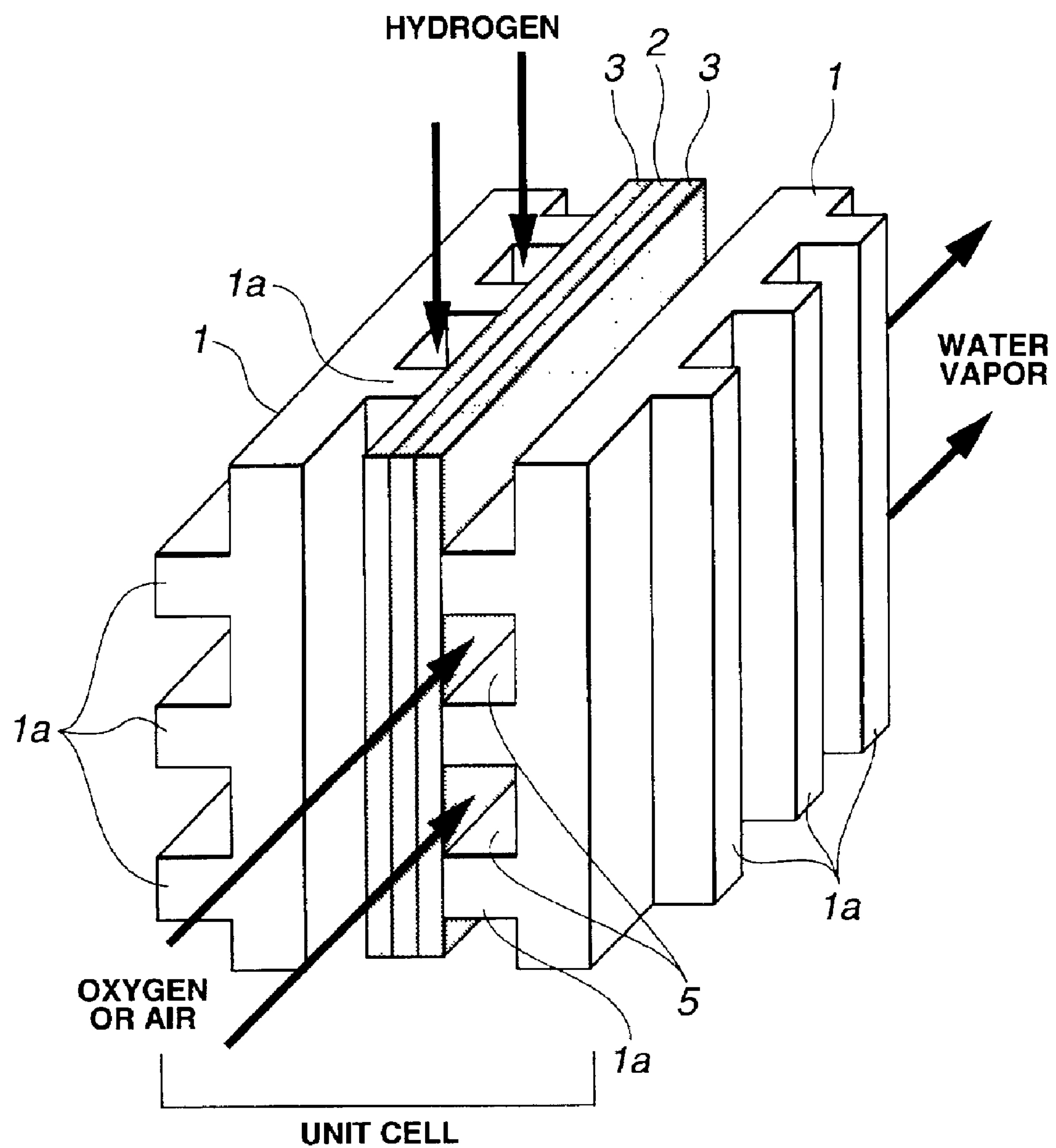
FIG. 1 is a perspective view showing one example of the fuel cell.

The stack of fuel cells consists of unit cells, each unit cell consisting of a fuel cell and a pair of separators, as shown in FIG. 1. The fuel cell consists of one polymer electrolyte membrane 2 and an electrode 3 for fuel gas and an electrode 3 for oxidizing agent tightly holding the membrane between them. The separators pertain to the present invention. One separator 1 adjacent to the electrode for fuel gas has a plurality of passages 5 and manifolds for fuel gas, and the other separator 1 adjacent to the electrode for oxidizing agent has a plurality of passages 5 and manifolds for oxidizing agent.

These unit cells are stuck in series and tightened between insulating plates supported by pressing plates. One electrode is supplied with fuel gas and the other electrode is supplied with oxidizing agent gas, so that the stack of fuel cells generates direct current.

According to the present invention, the stack of fuel cells is characterized in that all or part of separators therein are those which have high elasticity and good gas impermeability as defined above in the present invention. To be more specific, the percentage of the separators of the present invention in all the separators of the stack of fuel cells should be higher than 50%, preferably 50 to 100%, more preferably 70 to 100%, and most desirably 80 to 100%. If this percentage is lower than specified above, the stack of fuel cells will be poor in gas seal performance and impact resistance because the separators are liable to cracking by tightening at the time of assembling. In the case where the separators of the present invention are used partly, the rest may be supplied with conventional separators.

The above-mentioned polymer electrolyte membrane may be any ordinary one which is used for polymer electrolyte fuel cell. For example, it may be a proton-conducting ion-exchange membrane made of fluoroplastic resin, such as polytrifluorosulfonic acid and perfluorocarbonsulfonic acid ("Nafion"). The electrolyte membrane is coated with "Nafion 117 solution", which is a paste of a catalyst dispersed in a mixed solvent of water and lower aliphatic alcohol containing perfluorocarbon sulfonic acid. The catalyst is platinum or platinum alloy supported on carbon powder.

The pair of electrodes holding the polymer electrolyte membrane between them may be formed from carbon paper, carbon felt, or carbon cloth woven from carbon fiber.

The two electrodes are bonded to both sides of the polymer electrolyte membrane so that they are made into one piece. Bonding may be accomplished by hot-pressing at 120 to 130° C. or with the aid of an adhesive.

The unified combination of the electrodes and electrolyte membrane is held between a pair of separators in such a way that the separators form passages for fuel gas supply and discharge. Thus there is obtained the unit cell. Firm bonding may be ensured with an adhesive applied to the ribs of the separator in contact with the electrode.

The polymer electrolyte fuel cell which is constructed according to the present invention is immune to the cracking of separators at the time of assembling, exhibits good gas sealing performance, and high impact resistance. These advantages stem from that fact that all or part (preferably more than 50%) of the separators in the fuel cell are those separators pertaining to the present invention which have high elasticity and good gas impermeability. By virtue of these characteristic properties, the fuel cell is suitable for use as a mobile power source for cars, hybrid cars, and small ships.

Incidentally, the polymer electrolyte fuel cell according to the present invention will find use not only as a portable power source for cars, hybrid cars, small ships, etc. but also as a power source for local electric supply, domestic use, camping sites, artificial satellites, and space development.

The present invention permits efficient mass production of fuel cell separators having high elasticity, high electrical conductivity, and good gas impermeability. The polymer electrolyte fuel cell, in which all or part of separators are those pertaining to the present invention, is immune to the cracking of separators at the time of assembling, and exhibits good gas sealing performance and high impact resistance.

EXAMPLES

The invention will be described in more detail with reference to the following examples and comparative examples, which are not intended to limit the scope thereof. In Table 1, the amount of each component is given in terms of parts by mass.

Examples 1 and 2 and Comparative Examples 1 to 4

The components in each example shown in Table 1 were mixed together. After drying, the resulting mixture was injection-molded into a fuel cell separator under the following conditions by using an injection-molding machine (100F-45K, made by Matsuda Seisakusho). The fuel cell separator measures 120 mm long, 120 mm wide, and 2.3 mm thick, and has gas supply grooves 4 on both sides thereof as shown in FIG. 2A. Incidentally, in Comparative Examples 1 and 4, the molding composition was unable to be fed into the cylinder or transferred through the cylinder because of slipping on the screw.

Molding Conditions:

| | |
|---|---|
| Cylinder temperature: | 65° C. (at front) |
| Injection pressure: | 10 to 15 MPa |
| Injection time: | 5 to 15 seconds |
| Mold temperature: | 160 to 165° C. |
| Curing time: | 90 to 120 seconds |

The thus obtained separator was examined for moldability, gas impermeability, and the ratio of area occupied by graphite particles in the vertical cross section. The results are shown in Table 1. Reference photograph 1 shows the vertical cross section (×200) of the separator in Example 2. Reference photograph 2 shows the vertical cross section (×200) of the separator in Comparative Example 2.

Moldability

○: good

Δ: fair

×: poor

Gas Impermeability

A specimen (2 mm thick, 100 mm in diameter) cut out of the separator was tested for $N_2$ gas permeability (ml/m²·24 hr·atm) at 23° C. according to JIS K7126 providing "Method of evaluating the gas permeability of plastics film" (method B, equal pressure method). The results are rated according to the following criterion.

○: less than 20

Δ: 20 to $10^3$

×: more than $10^3$

Ratio of Area Occupied by Graphite Particles

An arbitrary vertical cross section (cut in the thickness direction) of the separator was observed under a microscope (×200) provided with a digital CCD camera ("Axioscope 2" made by Carl Zeiss Co., Ltd.) for calculation of the ratio of area occupied by graphite particles having the maximum length larger than 50 μm in the major axis direction and the maximum length larger than 30 μm in the minor axis direction. No data were available in Comparative Examples 1 and 4 because the molding composition was incapable of injection molding. Data in Comparative Examples 2 and 3 are inaccurate because the resulting separators were not uniform in properties.

Specimens (each measuring 100×100×4 mm) were molded from the molding compositions shown in Table 1. They were tested for flexural strength, flexural modulus, strain, and resistivity. The results are shown in Table 1.

Flexural Strength, Flexural Modulus, and Strain

Measured according to JIS K6911 providing the general test methods for thermosetting plastics.

Resistivity

Measured according to JIS H0602 (four point probe method for silicon single crystal and silicon wafer).

TABLE 1

| | Example No. | | Comparative Example No. | | | |
|---|---|---|---|---|---|---|
| | 1 | 2 | 1 | 2 | 3 | 4 |
| Graphite A | 100 | — | — | — | — | — |
| Graphite B | — | 100 | — | — | — | — |
| Graphite C | — | — | 100 | — | — | — |
| Graphite D | — | — | — | 100 | — | — |
| Graphite E | — | — | — | — | 100 | — |
| Graphite F | — | — | — | — | — | 100 |
| Phenolic resin *1 | 17.6 | 17.6 | 17.6 | 17.6 | 17.6 | 17.6 |
| Mold release *2 | 1.2 | 1.2 | 1.2 | 1.2 | 1.2 | 1.2 |
| Ratio of area occupied by graphite particles (%) | 71 | 65 | — | 62 | — | — |
| Gas impermeability | ○ | ○ | — | X | X | — |
| Moldability | ○ | ○ | X | Δ | Δ | X |
| Resistivity (mΩ · cm) | 12 | 13 | — | 18 | 20 | — |
| Flexural strength (MPa) | 42 | 46 | — | 39 | 50 | — |
| Flexural modulus (GPa) | 42 | 40 | — | 43 | 49 | — |
| Strain (mm) | 0.6 | 0.6 | — | 0.7 | 0.6 | — |

Graphite A: massive, having a mean particle diameter of 250 to 425 μm and a bulk density of 0.9 g/ml.
Graphite B: massive, having a mean particle diameter of 180 to 250 μm and a bulk density of 0.8 g/ml.
Graphite C: massive, having a mean particle diameter of 60 μm and a bulk density of 0.58 g/ml.
Graphite D: flake, having a mean particle diameter of 425 μm and a bulk density of 0.5 g/ml.
Graphite E: flake, having a mean particle diameter of 30 μm and a bulk density of 0.3 g/ml.
Graphite F: flake, having a mean particle diameter of 10 μm and a bulk density of 0.23 g/ml.
Incidentally, the density of graphite was measured according to JIS K6891-1995.
*1 Resol-type phenolic resin, "PL-4804" from Gun-ei Kagaku Co., Ltd.
*2 Zinc stearate

Example 3

Polymer Electrolyte Fuel Cell (1)

In this example, the unit cell is composed of a polymer electrolyte membrane ("Nafion") and a pair of electrodes (carbon paper from Chemics Co., Ltd.) holding the membrane between them. The membrane and electrodes were unified in the usual way. The unified electrode was held between the two separators prepared in Example 1. In this way there was obtained a unit cell having passages for fuel gas supply and discharge. Fifty pieces of the unit cells were assembled into a fuel cell by tightening with bolts and nuts. The separators did not crack at the time of assembling.

The resulting fuel cell was found to function satisfactorily. It was tested for vibration and shock resistance in anticipation of their use on a car. The separators remained intact after 1000 cycles of vibration and shock.

Example 4

Polymer Electrolyte Fuel Cell (2)

In this example, the unit cell is composed of a polymer electrolyte membrane ("Nafion") and a pair of electrodes (carbon paper from Chemics Co., Ltd.) holding the membrane between them. The membrane and electrodes were unified in the usual way. The unified electrode was held between the two separators prepared in Example 2. In this way there was obtained a unit cell having passages for fuel gas supply and discharge. One hundred pieces of the unit cells were assembled into a fuel cell by tightening with bolts and nuts. The separators did not crack at the time of assembling.

The resulting fuel cell was found to function satisfactorily. It was tested for vibration and shock resistance in anticipation of their use on a car. The separators remained intact after 1000 cycles of vibration and shock.

What is claimed is:

1. A fuel cell separator having gas supply grooves on one side or both sides thereof which is molded from a composition composed mainly of an electrically conductive carbon powder being spherical or massive graphite having a mean particle diameter of 150 to 500 μm and a binding agent, wherein the electrically conductive carbon powder is present such that its particles longer than 70 μm in the major axis direction and longer than 50 μm in the minor axis direction along the vertical cross section of the fuel cell separator occupy more than 50% of the sectional area in the vertical direction, wherein said binding agent is present in an amount of from 10 to 50 parts by mass per 100 parts by mass of the electrically conductive carbon powder.

2. A fuel cell separator having gas supply grooves on one side or both sides thereof which is molded from a composition composed mainly of an electrically conductive carbon powder and a binding agent, wherein said binding agent is contained in an amount of 10 to 50 parts by mass for 100 parts by mass of the electrically conductive carbon powder and the electrically conductive carbon powder is spherical or massive graphite having a mean particle diameter of 150 to 500 μm.

3. The fuel cell separator as defined in claim 2, wherein the spherical or massive graphite has a bulk density higher than 0.6 g/ml.

4. The fuel cell separator of claim 2 or 3, wherein the electrically conductive carbon powder is present such that its particles longer than 50 μm in the major axis direction and longer than 30 μm in the minor axis direction along the vertical cross section of the fuel cell separator occupy more than 50% of the sectional area in the vertical direction.

5. The fuel cell separator as defined in claim 1, which has a resistivity not higher than 20 mΩ·cm measured according to JIS H0602.

6. A process for producing a fuel cell separator having gas supply grooves on one side or both sides thereof from a composition composed mainly of an electrically conductive carbon powder and a binding agent, wherein said process comprises injection molding a mixture containing 10 to 50 parts by mass of a binding agent for 100 parts by mass of the electrically conductive carbon powder which is spherical or massive graphite having a mean particle diameter of 150 to 500 μm.

7. The process for producing a fuel cell separator as defined in claim 6, wherein the spherical or massive graphite has a bulk density higher than 0.6 g/ml.

8. A polymer electrolyte fuel cell comprising a plurality of unit cells connected together, each unit cell consisting of a pair of electrodes embracing a polymer electrolyte membrane and a pair of separators embracing the electrodes, said separators having passages molded thereon through which gas is supplied and discharged, characterized in that all or part of the separators in the unit cells are those which are defined in claim 1.

9. The fuel cell separator as defined in claim 2, which has a resistivity not higher than 20 mΩ·cm measured according to JIS H0602.

10. A polymer electrolyte fuel cell comprising a plurality of unit cells connected together, each unit cell consisting of a pair of electrodes embracing a polymer electrolyte membrane and a pair of separators embracing the electrodes, said separators having passages molded thereon through which gas is supplied and discharged, characterized in that all or part of the separators in the unit cells are those which are defined in claim 2.

11. The fuel cell separator as defined in claim 1, wherein the spherical or massive graphite has a bulk density higher than 0.6 g/ml.

12. The fuel cell separator as defined in claim 1, wherein the spherical or massive graphite has a bulk density of 0.6 to 1.2 g/ml.

13. The fuel cell separator as defined in claim 2, wherein the spherical or massive graphite has a mean particle diameter of 150 to 450 μm.

14. The process for producing a fuel cell separator as defined in claim 6, wherein the spherical or massive graphite has a mean particle diameter of 150 to 450 μm.

15. The fuel cell separator as defined in claim 2, wherein the spherical or massive graphite has a bulk density of 0.6 to 1.2 g/ml.

16. The process for producing a fuel cell separator as defined in claim 6, wherein the spherical or massive graphite has a bulk density of 0.6 to 1.2 g/ml.

17. The fuel cell separator of claim 1 wherein the conductive carbon is massive graphite.

18. The fuel cell separator of claim 2 wherein the conductive carbon is massive graphite.

* * * * *